United States Patent
Kersey et al.

(10) Patent No.: US 10,590,805 B2
(45) Date of Patent: Mar. 17, 2020

(54) GAS TURBINE ENGINE PACKAGE AND CORRESPONDING METHOD

(71) Applicant: Industrial Turbine Company (UK) Limited, Frimley, Camberley, Surrey (GB)

(72) Inventors: Brent R. Kersey, Delaware, OH (US); Christopher D. Gross, Granville, OH (US); Allan G. Hanson, Granville, OH (US); Loren J. Steady, Mount Vernon, OH (US); Anthony Maczura, Houston, TX (US)

(73) Assignee: Industrial Turbine Company (UK) Limited, Frimley, Camberley (GB)

( * ) Notice: Subject to any disclaimer, the term of this patent is extended or adjusted under 35 U.S.C. 154(b) by 421 days.

(21) Appl. No.: 15/503,122

(22) PCT Filed: Aug. 25, 2015

(86) PCT No.: PCT/US2015/046636
§ 371 (c)(1),
(2) Date: Feb. 10, 2017

(87) PCT Pub. No.: WO2016/032998
PCT Pub. Date: Mar. 3, 2016

(65) Prior Publication Data
US 2017/0234165 A1    Aug. 17, 2017

Related U.S. Application Data

(60) Provisional application No. 62/041,370, filed on Aug. 25, 2014.

(51) Int. Cl.
*F02C 7/20* (2006.01)
*F01D 25/28* (2006.01)
(Continued)

(52) U.S. Cl.
CPC ............ *F01D 25/285* (2013.01); *F02C 7/20* (2013.01); *F16M 5/00* (2013.01); *F16M 7/00* (2013.01);
(Continued)

(58) Field of Classification Search
CPC .......... F01D 25/28; F01D 25/285; F02C 7/20; F16M 5/00; F16M 7/00; F05D 2230/72;
(Continued)

(56) References Cited

U.S. PATENT DOCUMENTS 1,427,207 A * 8/1922 Gruendler ............... F25D 3/045
                                                    104/88.01
1,576,919 A * 3/1926 Lowery .................. A47C 17/80
                                                    5/119
(Continued)

FOREIGN PATENT DOCUMENTS

| FR | 2864209 | * 12/2003 |
| FR | 2864209 A1 | 6/2005 |
| WO | 2009008712 A1 | 1/2009 |

OTHER PUBLICATIONS

PCT Search Report and Written Opinion completed by the ISA/EP on Oct. 21, 2015 and issued in connection with PCT/US2015/046636.

*Primary Examiner* — William H Rodriguez
(74) *Attorney, Agent, or Firm* — Beusse Wolter Sanks & Maire

(57) ABSTRACT

A gas turbine engine unit (110) for use in a modular power generation system includes an engine package (112) and a mechanical handling system adapted to convey components (114) out of and into the engine package (112). The engine package (112) includes a floor (132), a plurality of side walls (136), and a ceiling (134) that cooperate to define a sheltered space (140) sized to receive a gas turbine engine. The mechanical handling system includes rails (121) adapted to
(Continued)

support components (114) conveyed out of and into the sheltered space (140) defined by the engine package (112).

19 Claims, 7 Drawing Sheets

(51) Int. Cl.
    *F16M 9/00*         (2006.01)
    *F16M 5/00*         (2006.01)
    *F16M 7/00*         (2006.01)
    *F02D 29/06*       (2006.01)

(52) U.S. Cl.
    CPC ............... *F16M 9/00* (2013.01); *F02D 29/06* (2013.01); *F05D 2230/72* (2013.01); *F05D 2240/90* (2013.01)

(58) Field of Classification Search
    CPC ....... F05D 2240/90; F02D 9/06; A47B 96/16; A47B 46/00; A47L 15/507
    USPC .... 248/188.2, 180.1, 346.05, 429, 637, 672; 211/26.2, 26; 312/311, 327, 328, 334.14; 220/1.5, 4.28; 410/150, 143
    See application file for complete search history.

(56) References Cited

U.S. PATENT DOCUMENTS

| | | | | |
|---|---|---|---|---|
| 1,632,725 A * | 6/1927 | Brown | ...................... | E01B 7/28 246/463 |
| 2,295,368 A * | 9/1942 | Suomala | ................ | G11B 17/16 312/22 |
| 2,297,995 A * | 10/1942 | Wise | ........................ | A47K 1/08 312/213 |
| 2,593,215 A * | 4/1952 | Summerhays | ............. | B61J 1/04 104/47 |
| 2,629,336 A * | 2/1953 | Seidel | ................... | A63H 19/34 104/38 |
| 2,789,234 A * | 4/1957 | Davies | ..................... | B60P 3/00 105/1.3 |
| 3,327,328 A * | 6/1967 | Slivoski | ................ | A47C 19/04 5/181 |
| 3,516,368 A * | 6/1970 | Wright | ..................... | B61D 3/04 105/455 |
| 3,861,769 A * | 1/1975 | Jenkins | ................. | A47L 15/507 312/311 |
| 4,919,498 A * | 4/1990 | Turner | ..................... | A47B 5/06 312/241 |
| 5,085,608 A * | 2/1992 | Turner | ................... | A47B 85/00 312/314 |
| 5,158,188 A * | 10/1992 | Nordberg | ............. | A61G 7/1015 212/312 |
| 5,474,374 A * | 12/1995 | Sandvig | ................. | A47B 77/18 312/271 |
| 5,797,565 A * | 8/1998 | Tuningley | ................. | E01B 7/28 246/465 |
| 6,962,057 B2 * | 11/2005 | Kurokawa | .............. | F01D 25/24 248/646 |
| 7,604,027 B2 * | 10/2009 | Thatcher | .................. | B25H 1/16 108/116 |
| 7,976,266 B2 * | 7/2011 | Brown | ...................... | F02C 7/20 248/157 |
| 8,162,419 B2 * | 4/2012 | Dellby | ................... | A47L 15/506 312/228.1 |
| 8,388,075 B2 * | 3/2013 | Sun | ...................... | H05K 7/1489 312/310 |
| 8,556,217 B1 * | 10/2013 | Voelkerding | .............. | E01B 7/28 246/454 |
| 8,590,151 B2 * | 11/2013 | Brown | ................... | F01D 25/285 184/1.5 |
| 8,621,873 B2 * | 1/2014 | Robertson | ............. | F01D 25/285 248/649 |
| 8,672,606 B2 * | 3/2014 | Glynn | ..................... | F01D 25/28 184/1.5 |
| 8,727,068 B2 * | 5/2014 | Bruin | .................... | F04B 53/002 181/200 |
| 9,157,641 B1 * | 10/2015 | Draper | .................. | F24C 15/026 |
| 9,512,723 B2 * | 12/2016 | Muller | .................. | B25B 27/06 |
| 9,533,695 B2 * | 1/2017 | Luddeneit | ................ | B61D 3/20 |
| 9,803,793 B2 * | 10/2017 | Davi | ....................... | F16M 1/00 |
| 2005/0133063 A1 * | 6/2005 | Welch | .................. | A47L 15/4246 134/10 |
| 2006/0043848 A1 * | 3/2006 | Jeong | ..................... | A47B 46/00 312/310 |
| 2006/0081756 A1 * | 4/2006 | Hallett | ................. | A47C 15/008 248/371 |
| 2008/0187431 A1 * | 8/2008 | Brown | ................... | F01D 25/28 415/1 |
| 2008/0216701 A1 * | 9/2008 | Wertz | ..................... | B61J 1/04 104/35 |
| 2008/0223356 A1 * | 9/2008 | Shenouda | .............. | F24C 15/02 126/1 R |
| 2009/0230072 A1 * | 9/2009 | Wierzba | ................ | B66C 11/04 212/324 |
| 2009/0322194 A1 * | 12/2009 | Backhaus | .............. | A47B 96/16 312/326 |
| 2010/0060093 A1 * | 3/2010 | Hunter | .................. | B60L 8/003 310/89 |
| 2010/0253191 A1 * | 10/2010 | Backhaus | ............. | A47B 96/16 312/309 |
| 2011/0279956 A1 * | 11/2011 | Sun | ..................... | H05K 7/1489 361/679.02 |
| 2012/0085269 A1 * | 4/2012 | Ohide | .................... | A47B 31/06 108/44 |
| 2017/0135554 A1 * | 5/2017 | Park | ........................ | A47L 15/16 |
| 2017/0268382 A1 * | 9/2017 | Muller | .................. | F01D 25/285 |
| 2017/0311718 A1 * | 11/2017 | Benson | ................... | A47B 81/00 |
| 2017/0354309 A1 * | 12/2017 | Kim | ...................... | A47L 15/23 |
| 2019/0106927 A1 * | 4/2019 | Lamb | .................... | E05F 17/004 |
| 2019/0274423 A1 * | 9/2019 | Sagel | .................... | A47B 57/00 |

\* cited by examiner

GAS TURBINE ENGINE PACKAGE AND CORRESPONDING METHOD

CROSS-REFERENCE TO RELATED APPLICATIONS

This application is a national stage entry under 35 USC § 371 of PCT International Application No. PCT/US2015/046636 filed Aug. 25, 2015 which claims the benefit of U.S. Provisional Patent Application No. 62/041,370 filed Aug. 25, 2014. There disclosures of PCT/US2015/046636 and U.S. Ser. No. 62/041,370 are incorporated herein by reference.

FIELD OF THE DISCLOSURE

The present disclosure relates generally to power generation units, and more specifically to power generation units with gas turbine engines.

BACKGROUND

Modular power generation units are used to provide electrical power when power from a large scale grid is unavailable or intermittent such as in remote locations or during power outages. For example, modular power generation units may be used on oil rigs in off-shore operations or on ocean-going ships. Many modular power generation units include a gas turbine engine module adapted to convert stored energy from fuel (e.g. natural gas etc.) into mechanical energy that may be used to drive an electrical generator unit.

Gas turbine engine units used in modular power generation units typically include a gas generator, a power turbine, and an engine package that shelters the gas generator along with the power turbine. Various handling systems for removing the gas generator and/or the power turbine from the engine package have been devised to allow for repair or replacement of the gas generator and/or the power turbine. For example, overhead lift systems have been designed to lift gas generators and power turbines upwardly out of engine packages before being lowered into transport dollies. Use of an overhead lift system may be difficult in situations when the engine package is moving during lifting such as when an oil rig or ship pitches and rolls due to ocean waves and/or in situations when high winds cause movement of components being lifted from the engine package.

SUMMARY

The present disclosure may comprise one or more of the following features and combinations thereof.

According to one aspect of the present disclosure, a gas turbine engine unit for use in a modular power generation system may include an engine package that defines a sheltered space, a gas generator arranged in the sheltered space, and a mechanical handling system. The mechanical handling system may be adapted to convey the gas generator from inside the sheltered space defined by the engine package to outside the sheltered space for repair or replacement.

In some embodiments, the engine package may include a floor, a plurality of side walls, and a ceiling that cooperate to define the sheltered space. The mechanical handling system may include a door, a plurality of floor rails, and a plurality of door rails. The door may be coupled to the engine package to pivot about a horizontal axis between a substantially vertical closed position and a substantially horizontal opened position. The plurality of floor rails may be coupled to the floor of the engine package. The plurality of door rails may be coupled to the door to move with the door between a stowed position arranged in the sheltered space when the door is in the closed position and a use position outside the sheltered space when the door is in the opened position.

In some embodiments, the mechanical handling system may include at least one leg. The at least one leg may be coupled to the door to pivot about a leg axis relative to the door between a stored position extending generally parallel to the door and a support position extending generally perpendicular to the door. The at least one leg may include a main member and an extension member coupled to the main member to slide relative to the main member between a retracted position and an extended position to change the length of the at least one leg.

In some embodiments, the mechanical handling system may include a transportation stand coupled to the gas generator for movement with the gas generator from inside the sheltered space to outside the sheltered space. The transportation stand may include a frame coupled to the gas generator and a plurality of roller feet coupled to the frame. The roller feet may be arranged to engage the floor rails when the gas generator is inside the sheltered space and may be arranged to engage the door rails when the gas generator is moved outside the sheltered space. In some embodiments, each roller foot may include a support plate coupled to the frame, a first roller coupled to the support plate, and a second roller coupled to the support plate at a location spaced along a floor rail or a door rail from the first roller.

In some embodiments, the mechanical handling system may include at least one bridge rail. The at least one bridge rail may be adapted to be coupled to the engine package and may be sized to fill at least a portion of a gap formed between one of the floor rails and a corresponding one of the door rails when the door is moved to the opened position and the door rails are moved to the use position.

In some embodiments, the gas turbine engine unit may include a power turbine. The power turbine may be arranged in the sheltered space defined by the engine package. The mechanical handling system may include a transportation sled coupled to the power turbine. The transportation sled may be configured to engage the floor rails and the door rails.

In some embodiments, the transportation sled may include a frame coupled to the power turbine and a plurality of roller feet. Each of the roller feet may include a support plate coupled to the frame, a first roller coupled to the support plate, and a second roller coupled to the support plate.

In some embodiments, the mechanical handling system may include a plurality of alignment rails coupled to the floor of the engine package. The alignment rails may extend generally perpendicular to the floor rails.

According to another aspect of the present disclosure, a gas turbine engine unit may include an engine package and a mechanical handling system configured to convey a gas generator out of the engine package. The engine package may include a floor, a plurality of side walls, and a ceiling that cooperate to define a sheltered space. In some embodiments, the mechanical handling system may include a door movable relative to the engine package between a closed position and an opened position, a plurality of floor rails coupled to the floor of the engine package, and a plurality of door rails coupled to the door to move with the door relative to the engine package.

In some embodiments, the mechanical handling system may include at least one leg coupled to the door. The at least one leg may extend generally perpendicular to the door from a side of the door opposite the door rails. In some embodiments, the at least one leg may be coupled to the door to pivot about an axis.

In some embodiments, the mechanical handling system may include at least one bridge rail. The bridge rail may be arranged in a gap formed between one of the floor rails and a corresponding one of the door rails.

In some embodiments, the mechanical handling system may include a plurality of alignment rails coupled to the floor of the engine package. The alignment rails may extend generally perpendicular to the floor rails.

According to another aspect of the present disclosure, a method of removing components from an engine package may include pivoting a door mounted to the engine package from a substantially vertical closed position to a substantially horizontal opened position. The method may also include sliding a gas generator out of a sheltered space defined by the engine package along a plurality of floor rails mounted to a floor of the engine package and a plurality of door rails mounted to the door.

In some embodiments, the method may also include pivoting at least one leg coupled to the door about a leg axis relative to the door. The at least one leg may be moved from a stored position extending generally parallel to the door to a support position extending generally perpendicular to the door.

In some embodiments, the method may include sliding the gas generator within the sheltered space defined by the engine package along a plurality of alignment rails. The alignment rails may extend generally perpendicular to the floor rails.

In some embodiments, the method may include sliding a power turbine out of the sheltered space along the plurality of floor rails mounted to a floor of the engine package and the plurality of door rails mounted to the door. The method may include sliding the power turbine within the sheltered space defined by the engine package along a plurality of alignment rails extending generally perpendicular to the floor rails.

These and other features of the present disclosure will become more apparent from the following description of the illustrative embodiments.

BRIEF DESCRIPTION OF THE DRAWINGS

FIG. 11 is a perspective view of the gas turbine engine unit with the door of the mechanical handling unit in the closed position before a user pivots the door about a horizontal axis to the opened position as shown in FIG. 12;

FIG. 12 is a perspective view of the gas turbine engine unit with the door of the mechanical handling unit pivoted to the opened position showing that door rails coupled to the door are aligned with floor rails coupled to a floor of the engine package;

FIG. 13 is a perspective view the gas turbine engine unit showing the drive turbine included in the gas turbine engine unit slid out from a shelter space defined by the engine package onto the door rails arranged outside the engine package; and FIG. 14 is a perspective view of the gas turbine engine unit showing the power turbine included in the gas turbine engine unit slid out from the shelter space defined by the engine package onto the door rails arranged outside the engine package.

DETAILED DESCRIPTION OF THE DRAWINGS

Figure 1:
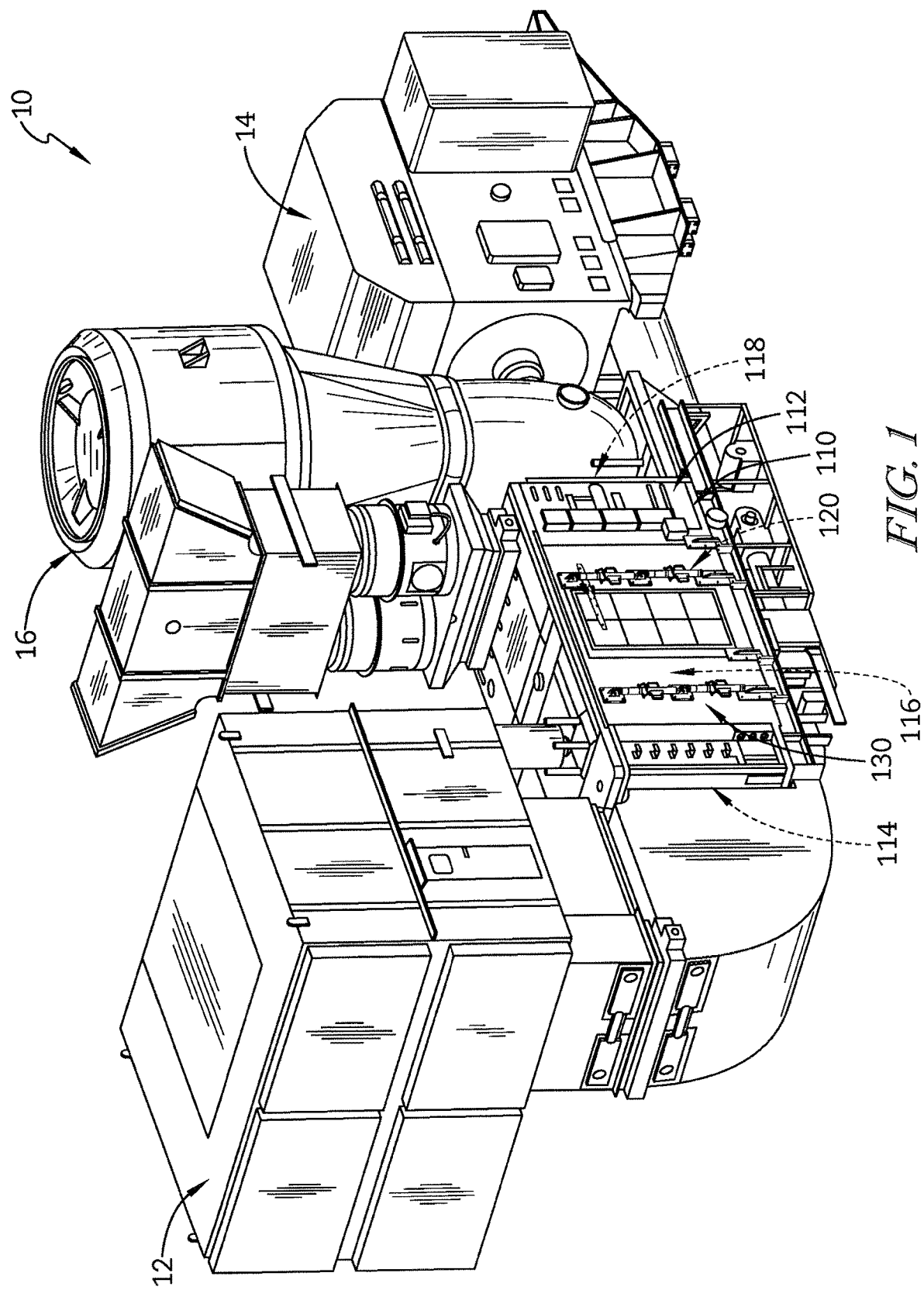
FIG. 1 is a perspective view of a modular power generation system showing that the modular power generation system includes an air inlet unit, a gas turbine engine unit, and an electrical generator unit.

For the purposes of promoting an understanding of the principles of the disclosure, reference will now be made to a number of illustrative embodiments illustrated in the drawings and specific language will be used to describe the same.

An illustrative modular power generation system 10 adapted to produce electricity is shown in FIG. 1. The modular power generation system 10 includes an air inlet unit 12, a gas turbine engine unit 110, and an electrical generator unit 14. The air inlet unit 12 receives and conveys atmospheric air to the gas turbine engine unit 110 be mixed with fuel and burned by the gas turbine engine unit 110. The gas turbine engine unit 110 converts stored energy from fuel (such as natural gas etc.) into mechanical energy that is transferred to the electrical generator unit 14 via combustion within the gas turbine engine unit 110. Leftover products of combustion within the gas turbine engine unit 110 are exhausted through an exhaust 16 coupled to the gas turbine engine unit 110. The mechanical energy transferred to the electrical generator unit 14 is used to produce electrical power for various applications.

Figure 2:
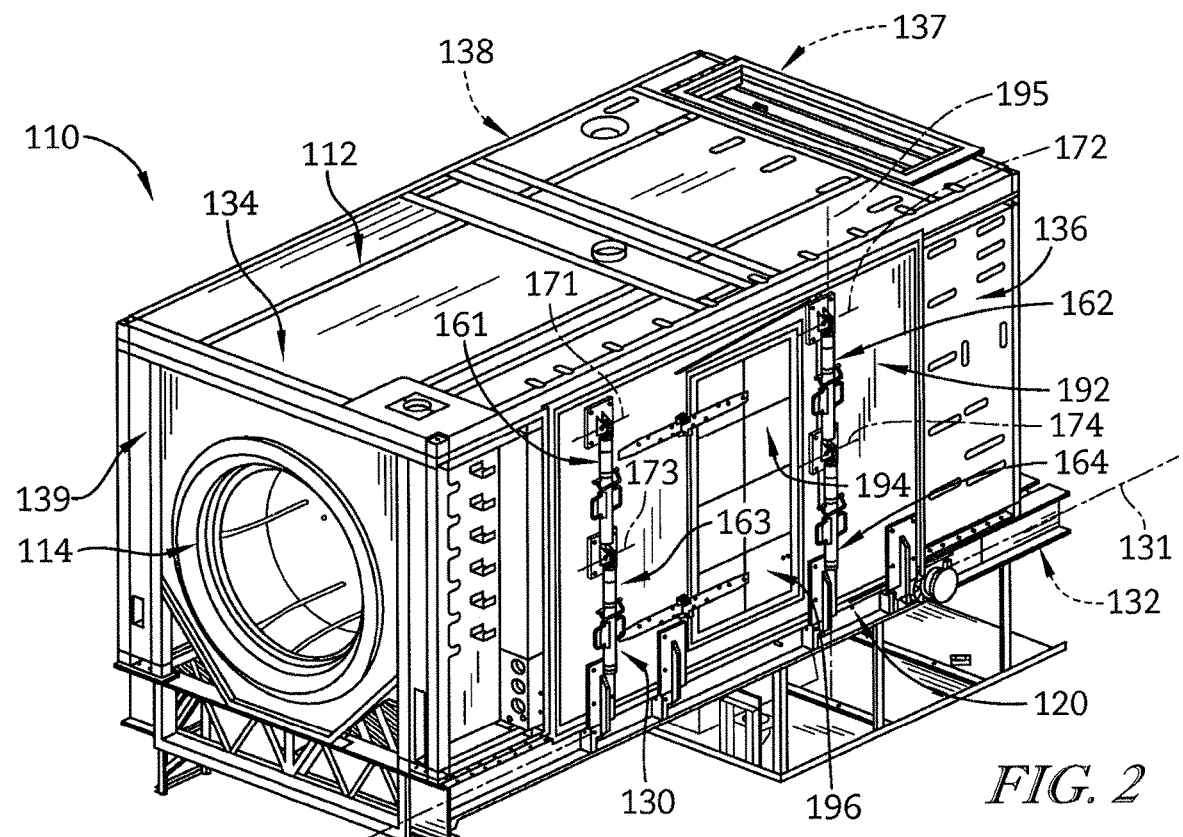
FIG. 2 is a perspective view of the gas turbine engine unit of FIG. 1 showing a door mounted to a side wall of an engine package in a closed position blocking access to components sheltered in the engine package.
Figure 3:
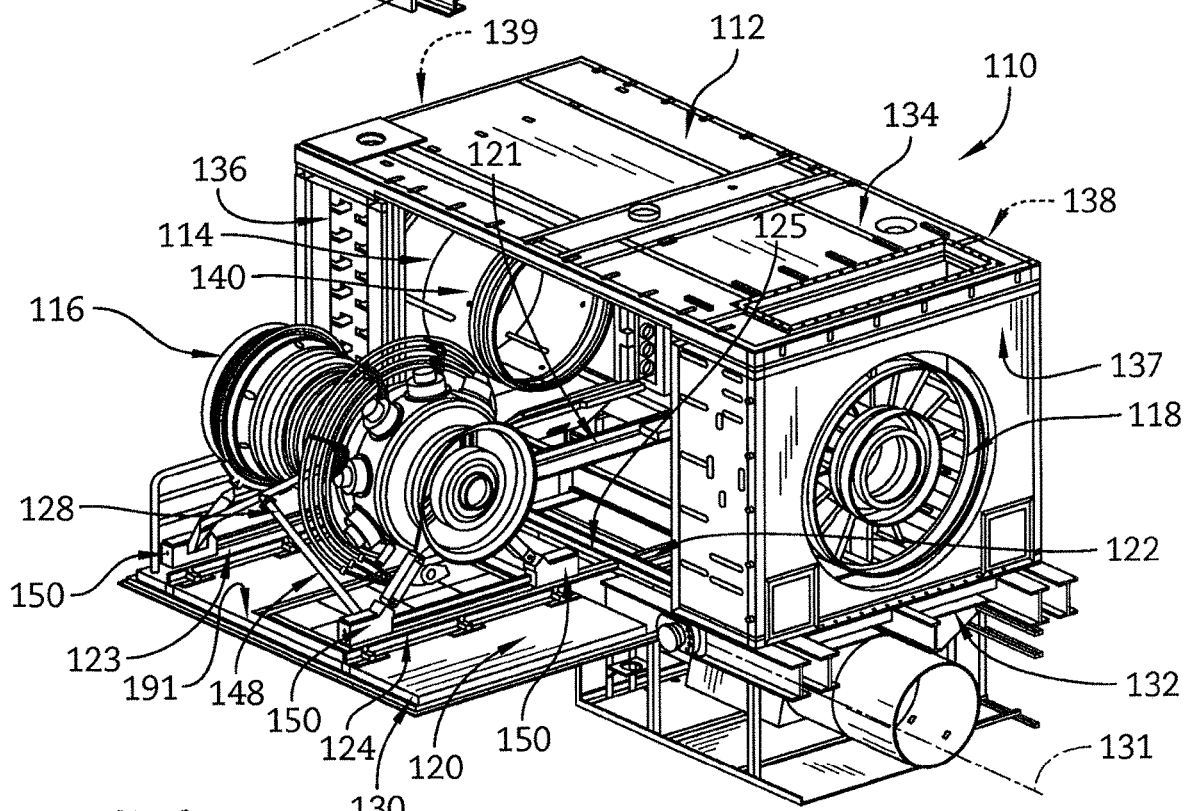
FIG. 3 is a perspective view of the gas turbine engine unit of FIGS. 1 and 2 showing the door pivoted about a horizontal axis to an opened position allowing access to components in the engine package and showing a gas generator moved out of the engine package along rails included in a mechanical handling system integrated into the engine package.

The gas turbine engine unit 110 illustratively includes an engine package 112, an engine inlet bell 114, a turbine engine gas generator 116, and a power turbine 118 as shown, for example, in FIGS. 2 and 3. The engine package 112 houses and protects the other components 114, 116, 118 from rain, salt, dirt, and other atmospheric contaminants. The engine inlet bell 114 extends into the engine package 112 and conditions air before it is ingested by the gas generator 116. The power turbine 118 is driven by hot, high-pressure gas generated by the gas generator 116 transmits mechanical energy to the electrical generator unit 114.

The gas turbine engine unit 110 also includes a mechanical handling system 120 integrated with the engine package 112 as shown in FIG. 3. The mechanical handling system 120 is adapted to convey components out of and into the engine package 112 as suggested in FIGS. 11-14. The mechanical handling system 120 illustratively includes rails 121-126, a transport stand 128, and a door 130 as shown in FIG. 3. The rails 121-126 are engaged by the transport stand 128 such that movement of the transport stand 128 is guided along the rails 121-126. The transport stand 128 in the illustrative embodiment supports the gas generator 116 so that the gas generator may be moved along the rails 121-126. The door 130 is illustratively coupled to the engine package 112 to pivot relative to the engine package 112 about a horizontal axis 131 from a closed position, as shown in FIG. 2, to an opened position, as shown in FIG. 3, to selectively allow components to move out of or into the engine package 112.

The engine package 112 illustratively provides a climate controlled acoustic enclosure for other components of the gas turbine engine unit 110 which are protected from the elements as shown in FIG. 3. The engine package 112 includes a floor 132, a ceiling 134, and a plurality of side walls 136-139 that cooperate to define a shelter space 140. The shelter space 140 is generally protected from atmospheric conditions around the gas turbine engine unit 110 and receives the gas generator 116 and the power turbine 118 when the gas turbine engine unit 110 is in use as part of the modular power generation system 10. The shelter space 140 also receives all of the rails 121-126 and other tooling associated with the mechanical handling system 120 when the gas turbine engine unit 110 is in use and the door 130 is in the closed position as shown in FIG. 2. Accordingly, the rails 121-126 and other tools are protected from the elemental damage, loss, and degradation over time.

Figure 4:
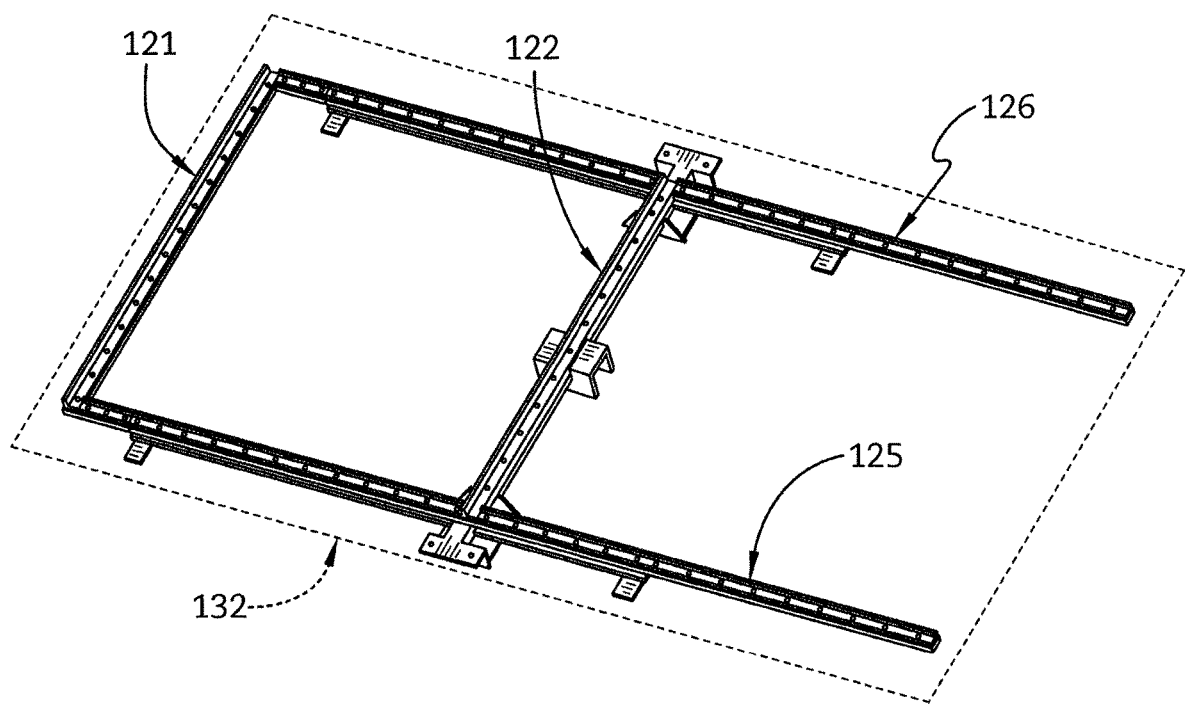
FIG. 4 is a perspective view of two sets of rails mounted to a floor of the engine package showing that one set of rails extend generally along the length of the engine package to facilitate movement of the gas generator within the engine package and the other set of rails is set perpendicular to the first set to facilitate movement of the gas generator out of the engine package.

The rails 121-126 of the mechanical handling system 120 illustratively include floor rails 121, 122, door rails 123, 124, and alignment rails 125, 126 as shown in FIG. 3. The floor rails 121, 122 are coupled to the floor 132 of the engine package 112 and are arranged to guide components through an opening 141 formed in a first side wall 136 of the engine package 112 around the door 130. The door rails 123, 124 are coupled to the door 130 for movement with the door 130. The alignment rails 125, 126 are coupled to the floor 132 of the engine package 112 and extend generally perpendicular to the floor rails 121, 122 as shown in FIG. 4. In the illustrative embodiment, the floor rails 121, 122 and the alignment rails 125, 126 form intersecting upwardly facing channels as shown in FIG. 4 that allow roller balls to switch direction while rolling along the rails 121, 122, 125, 126 and supporting a component being moved along the rails 121, 122, 125, 126.

The door rails 123, 124 move with the door 130 between a stowed position arranged in the sheltered space 140 when the door 130 is in the closed position and a use position outside the sheltered space 140 when the door 130 is in the opened position as shown in FIGS. 2 and 3. The door rails 123, 124 are sized so as not to interfere with the gas generator 116, the power turbine 118, or other components in the sheltered space 140 when the door 130 is in the closed position. The door rails 123, 124 illustratively extend generally vertically and are generally perpendicular to with the floor rails 121, 122 when the door 130 is in the closed position.

The door rails 123, 124 illustratively extend generally horizontally and are aligned with the floor rails 121, 122 so that upwardly facing channels formed by the door rails 123, 124 are arranged to receive roller balls moving along floor rails 121, 122 when the door 130 is in the opened position. Thus, a component guided by the floor rails 121, 122 through the opening 141 is further guided by the door rails 123, 124 as the component moves outside the engine package 112.

In some embodiments, the door 130 may be coupled to the engine package 112 for movement along the horizontal axis 131. Movement of the door 130 along the axis 131 may allow for adjustment to the alignment of the door rails 123, 124 with the floor rails 121, 122 prior to transition of a component from the floor rails 121, 122 to the door rails 123, 124. In some embodiments, the floor rails 121, 122 and/or the door rails 123, 124 may be moveable parallel to the horizontal axis 131 to allow for adjustment to the alignment of the door rails 123, 124 with the floor rails 121, 122 prior to transition of a component from the floor rails 121, 122 to the door rails 123, 124.

Figure 5:
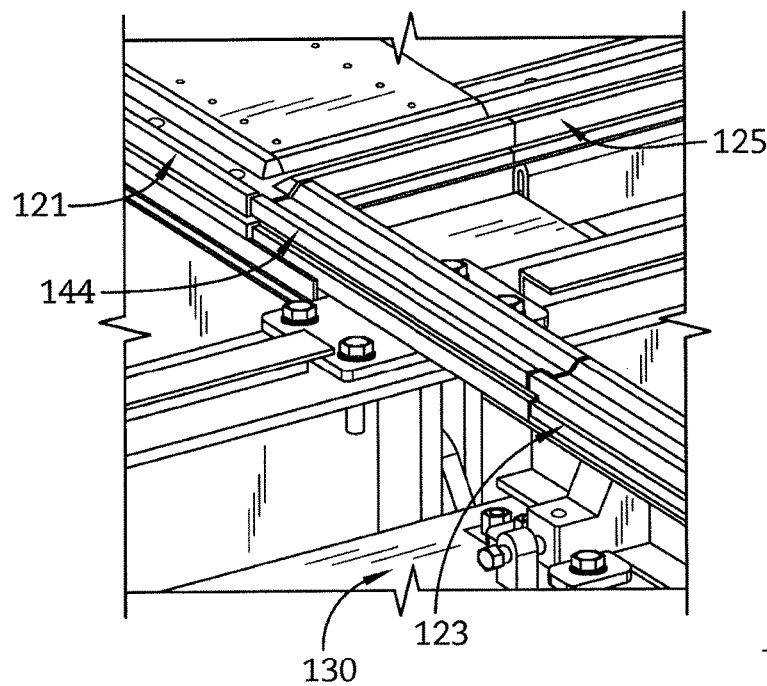
FIG. 5 is a detail view of a bridge rail included in mechanical handling system showing that the bridge rail is adapted to fill a gap formed between a floor rail coupled to the floor of the engine package and a corresponding door rail coupled to the door when the door is moved to the opened position.

In the illustrative embodiment, the mechanical handling system 120 includes optional bridge rails 144 adapted to fill a gap 145 formed between the floor rails 121, 122 and a corresponding one of the door rails 123, 124 when the door 130 is moved to the opened position as suggested in FIG. 5. Each bridge rail 144 forms an upwardly facing channel that aligns with upwardly facing channels of the floor rails 121, 122 and the door rails 123, 124 to receive roller balls moving between the floor rails 121, 122 and the door rails 123, 124 and avoiding an unsupported condition. The bridge rails 144 may be removed from the gap 145 and stowed within the shelter space 140 of the engine package 112 by removably attaching the bridge rails 144 to side walls 136-139 of the engine package 112 or to the door 130 when the door 130 is moved to the closed position.

The transportation stand 128 is illustratively coupled to the gas generator 116 for movement with the gas generator 116 from inside the sheltered space 140 to outside the sheltered space 140 as suggested in FIGS. 2 and 3. The illustrative transportation 128 stand includes a frame 148 coupled to the gas generator 116 and a plurality of roller feet 150 coupled to the frame 148 as shown in FIG. 3. The roller feet 150 are arranged to engage the various rails 121-126 (and 144) as the gas generator 116 moves around and out of the sheltered space 140 of the engine package 112. In the illustrative embodiment, the transportation stand 128 may remain in the sheltered space 140 but is detached from the gas generator 116 during operation of the modular power generation system 10. Accordingly, the transportation stand 128 is available when removal of the gas generator 116 is desired.

Figure 7:
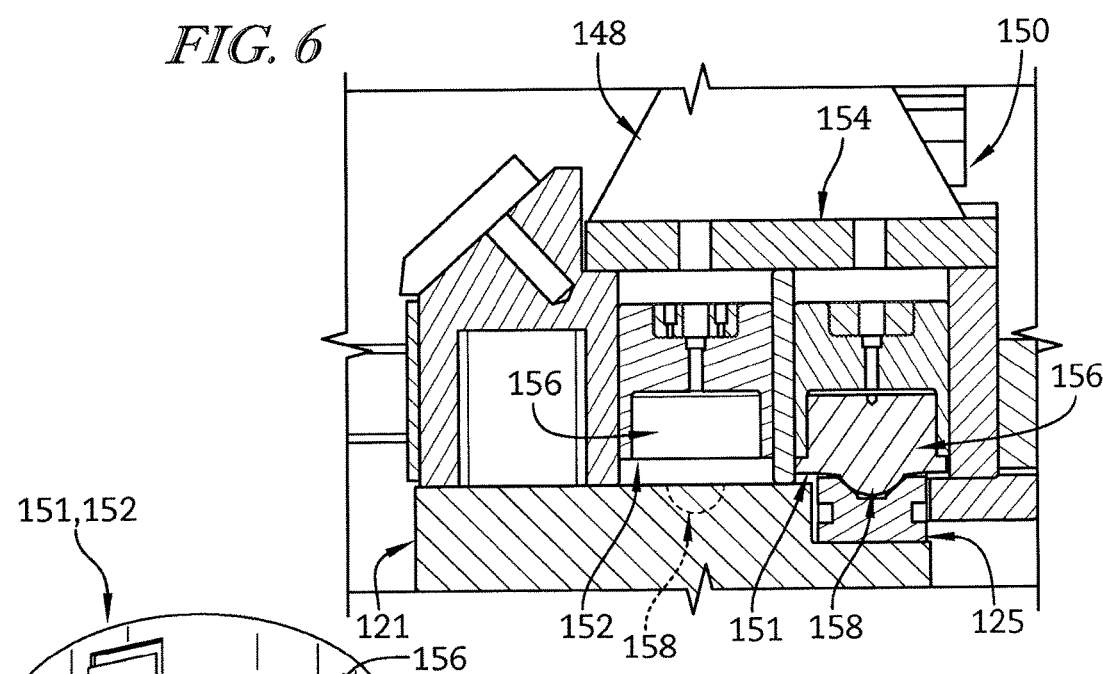
FIG. 7 is a cross-sectional view of the roller foot shown in FIG. 6 showing that the roller foot includes a support plate and two rollers mounted to the support plate so that even if the roller ball included in the first roller is unsupported at a gap in the underlying rails the other roller ball included in the second roller is engaged with the underlying rails and supports the gas generator.
Figure 8:
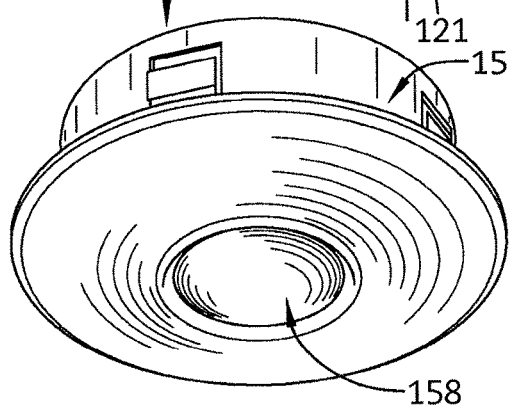
FIG. 8 is a perspective view of one illustrative roller adapted for use in the roller foot of FIGS. 7 and 8.

Each roller foot 150 is substantially similar and each roller foot 150 includes a pair of rollers 151, 152, and a support plate 154 as shown in FIG. 7. Each roller 151, 152 is coupled to the support plate 154 and includes a socket 156 and a roller ball 158. The rollers 151, 152 are spaced apart from one another along a line perpendicular to the alignment rails 125, 126 and allow for one of the roller balls 158 to be out of contact with the underlying rails 121-126 (and 144) at gaps between rails 121-126 (and 144). The rollers 151, 152 are ball transfer units of the type available from Bosch Rexroth.

Figure 9:
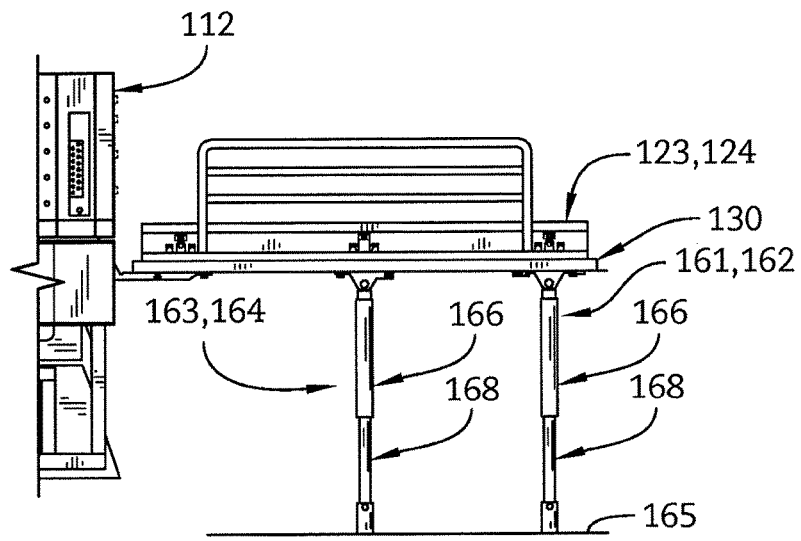
FIG. 9 is a side elevation view of a portion of the engine package and the mechanical handling system showing that the mechanical handling system includes a plurality of legs coupled to the door to pivot relative to the door and adapted to extend from the door to an underlying platform when the door is in the opened position.

The mechanical handling system 120 further includes a plurality of legs 161-164 coupled to the door 130 and adapted to extend from the door 130 to an underlying platform 165 when the door 130 is in the opened position as shown in FIG. 9. Each leg 161-164 is coupled to the door 130 on an external side of the door 130 opposite the door rails 123, 124. Each leg 161-164 is adapted to pivot about corresponding leg axes 171-174 relative to the door 130 as suggested in FIG. 2. Each leg 161-164 is movable between a stored position extending generally parallel to the door 130, as shown in FIG. 2, and a support position extending generally perpendicular to the door 130 as shown in FIG. 9.

Each leg 161-164 includes a main member (tube) 166 and an extension member (tube) 168 as shown in FIG. 9. The extension member 168 is coupled to the main member 166 to slide relative to the main member between a retracted position and an extended position to change the length of a leg 161-164. In the illustrative embodiment, the extension members 168 telescope into the main members 166.

Figure 10:
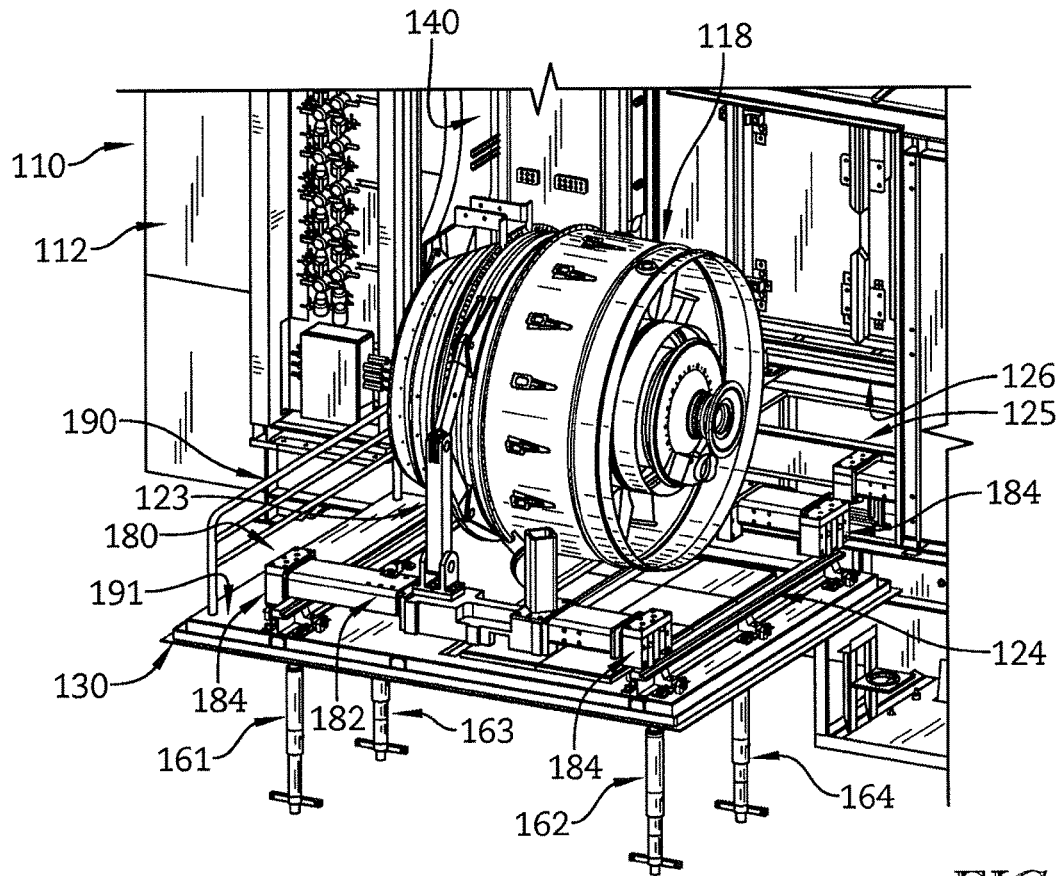
FIG. 10 is a perspective view of a portion of the gas turbine engine unit of FIGS. 1-3 showing a power turbine mounted to a transportation sled included in the mechanical handling system and moved out of the engine package along the rails included in the mechanical handling system.

The mechanical handling system 120 in the illustrative embodiment further includes a transportation sled 180 as shown in FIG. 10. The transportation sled 120 is coupled to the power turbine 118 for movement with the power turbine 118 and is adapted to facilitate removal of the power turbine 118 from the engine package 112. Overhaul periods of gas generator 116 and power turbine 118 may be different and the separate transportation stand 128 and transportation sled 180 provide the ability to leave the power turbine 118 in the engine package 112 during gas generator 116 repair or replacement.

The transportation sled 180 illustratively includes a frame 182 and a plurality of roller feet 184 as shown in FIG. 10. The frame 182 is adapted to couple to attachment points included in the power turbine 118 and is coupled to the roller feet 184. The roller feet 184 are is configured to engage the rails 121-126 (and 144) during movement of the power turbine 118 along and out of the engine package 112. In the illustrative embodiment, the transportation sled 180 may remain attached to the power turbine 118 during operation of the modular power generation system 10 to minimize the number of tools needed during removal of the power turbine 118 from the engine package 112.

Figure 6:
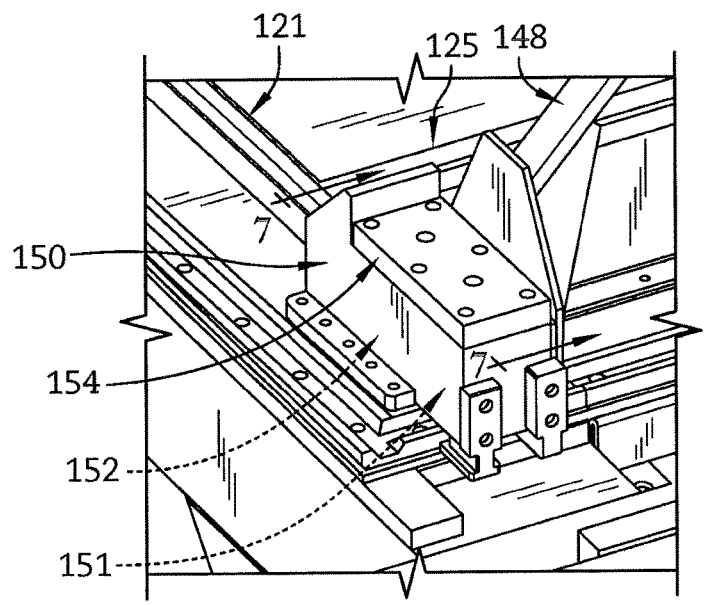
FIG. 6 is a detail view of a roller foot included in a transportation stand of the mechanical handling system showing that the roller foot engages the rails to guide movement of the gas generator along the rails.

Each of the roller feet 184 is substantially similar to the roller feet 150 included in the transportation stand 128, shown in FIGS. 6-7. Particularly each roller foot 184 includes a pair of rollers (similar to rollers 151, 152) and a support plate coupled to the rollers (similar to plates 154).

Hand rails 190 may also be included in the mechanical handling system 120 as shown in FIGS. 3, 9, and 10. Hand rails 190 may be removably or pivotably coupled to the door 130 and may be deployed to extend upwardly from the door 130 when the door is in the opened position. In some embodiments, non-slip floor grating 191 may be mounted to the door 130 on the same side as the door rails 123, 124 to prevent a worker from slipping while using the door 130 as a work stand. The grating 191 may be made from fiberglass or another suitable material.

The door 130 of the illustrative embodiment includes a main panel 192 and a walk door 194 as shown in FIG. 1. The main panel 192 supports the door rails 123, 124 and is formed to define a walk opening 196 sized to allow a worker to get into and out of the engine package 112. The walk door 194 is coupled to the main panel 192 to pivot about an axis 195 perpendicular to the axis 131 and is configured to block or allow access to the sheltered space 140 within the engine package 112 through the walk opening 196. In some embodiments, the walk door 194 may be mounted to slide relative to the main panel 192 to selectively open the walk opening 196. In other embodiments, the walk door 194 may be omitted or may be mounted to the side walls 136-139 of the engine package 112 to allow worker access into the sheltered space 140.

Figure 11:
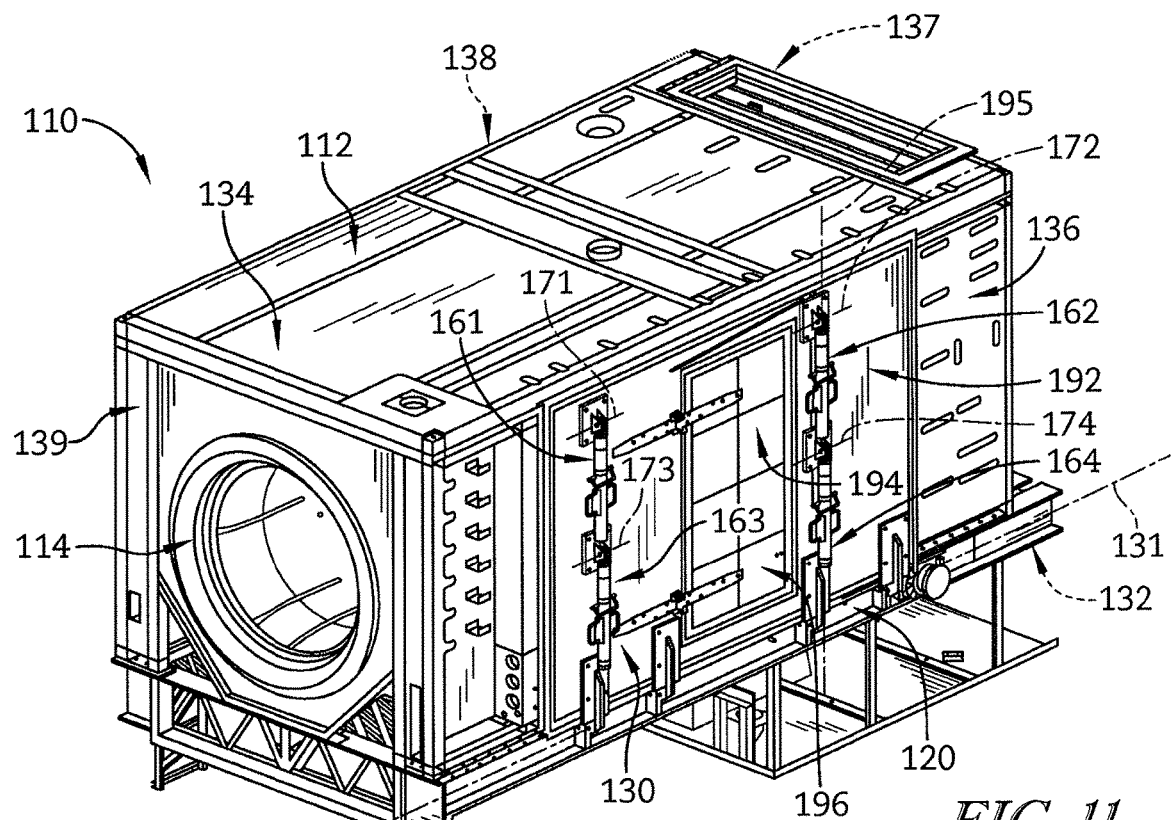
FIGS. 11-14 are a series of views showing a method of removing components from the gas turbine engine unit using the mechanical handling system of FIGS. 10.
Figure 12:
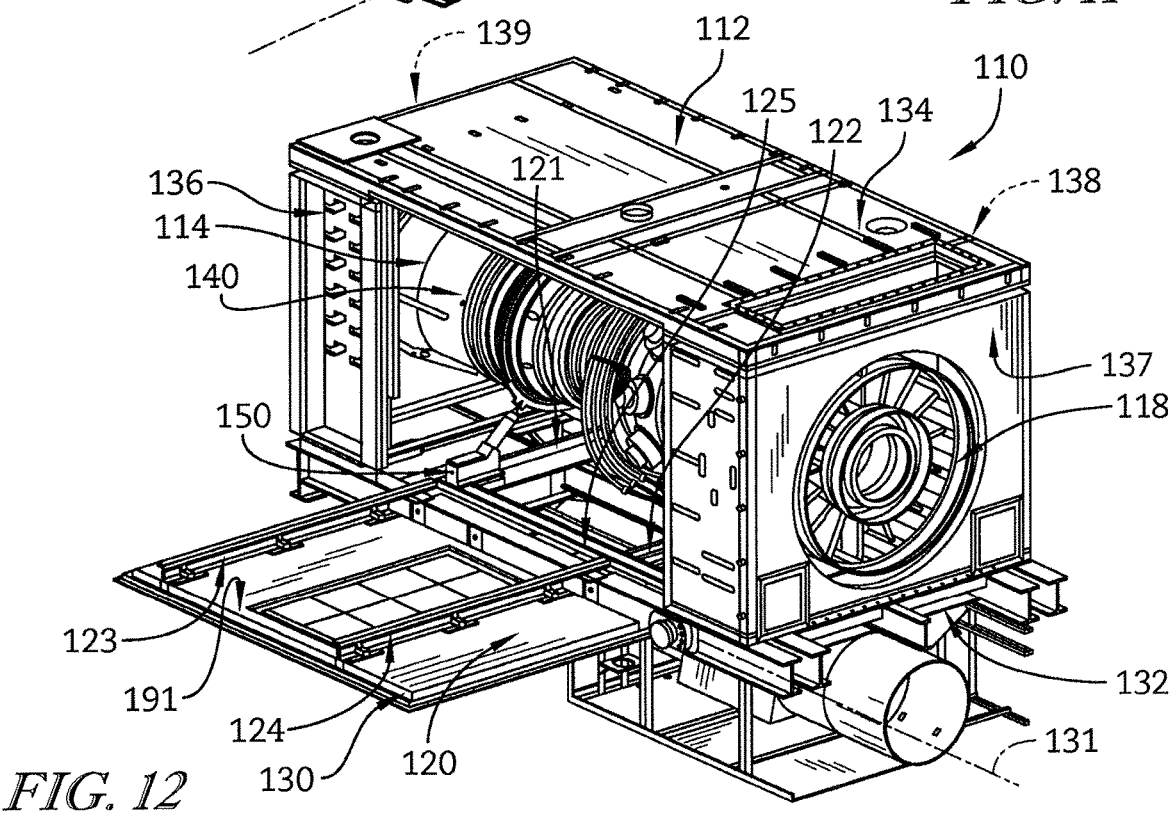

Turning now to FIGS. 11-14, a method of removing the gas generator 116 and the power turbine 118 from the engine package 112 of the gas turbine engine unit 110 is shown. According to the disclosed method, the door 130 mounted to the engine package 112 is pivoted from a substantially vertical closed position, as shown in FIG. 11, to a substantially horizontal opened position as shown in FIG. 12. In addition to pivoting of the door 130, the legs 161-164 may be pivoted from the stored position to the support position and may be extended to engage the platform 165 under the door 130.

The frame 154 included in the transportation stand 128 is coupled to the gas generator 116 and the outer roller 151 of each foot 150 included in the transportation stand 128 is lowered into the channel of the alignment rails 125, 126. The gas generator 116, along with the transportation stand 128, slides away from the power turbine 118 toward the inlet bell 114 within the engine package 112 along the alignment rails 125, 126 until the transportation stand engages the floor rails 121, 122 that extend across the engine package 112.

Prior to sliding of the gas generator 116 and the transportation stand 128 out of the engine package 112 as shown in FIG. 12, the door 130 may slide along the horizontal pivot axis 131 so that the door rails 123, 124 align with the floor rails 121, 122 as shown in FIG. 12. In some embodiments, the door rails 123, 124 may slide relative to the door 130 and/or the floor rails 121, 122 may slide relative to the floor 132 of the engine package 112 so that the door rails 123, 124 align with the floor rails 121, 122.

Figure 13:
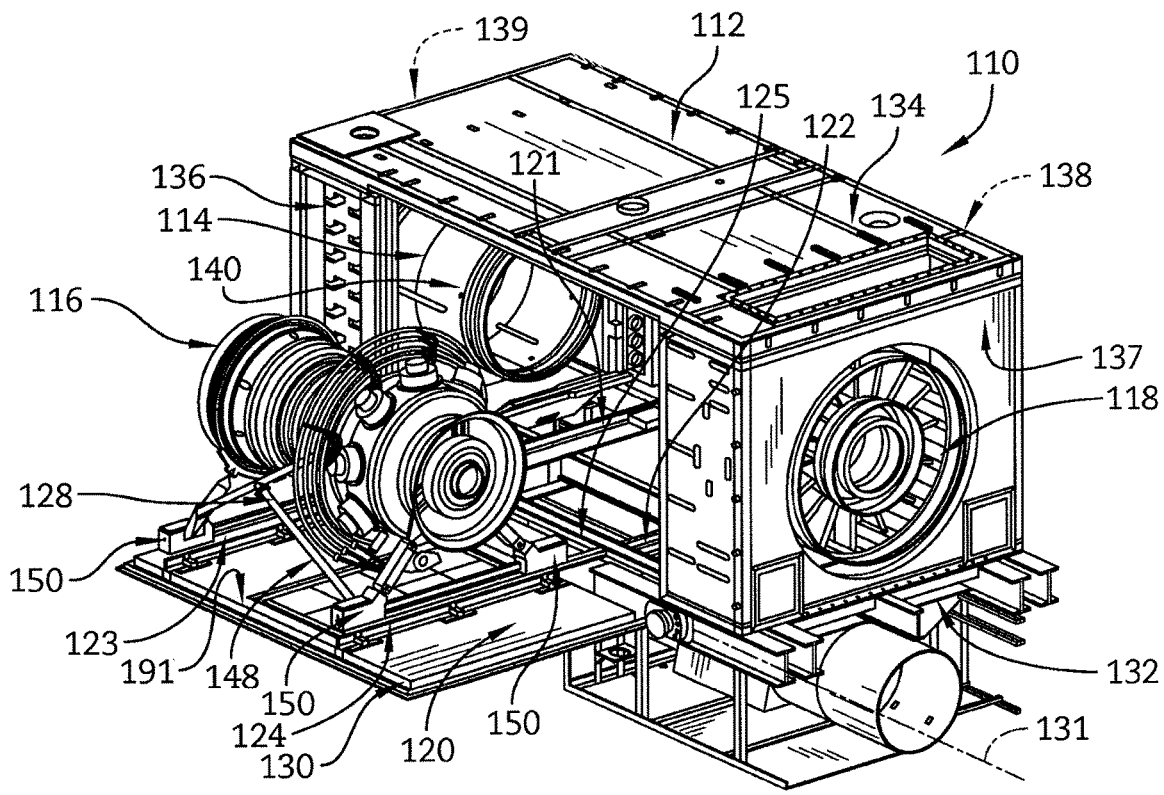

When the gas generator 116 and the transportation stand 128 reach the floor rails 121, 122, the gas generator 116 and the transportation stand 128 slide perpendicular to the alignment rails 125, 126 along the floor rails 121, 122 as suggested in FIGS. 12 and 13. The gas generator 116 and the transportation stand 128 move along the floor rails 121, 122 out of the sheltered space 140 and onto the door rails 123, 124 as shown in FIG. 13. From a position resting on the door 130 outside the engine package 112, the gas generator 116 can be lifted up by a hoist and lowered into a transport can or onto the platform 165 for repair or replacement.

Upon removal of the gas generator 116 from the engine package 112, the outer roller of each foot 184 included in the transportation sled 180 may be lowered into the channel of the alignment rails 125, 126 (if the rollers are not already engaged with the alignment rails 125, 126). The power turbine 118, along with the transportation sled 180, slides toward the inlet bell 114 within the engine package 112 along the alignment rails 125, 126 until the transportation sled 180 engages the floor rails 121, 122 that extend across the engine package 112.

Figure 14:
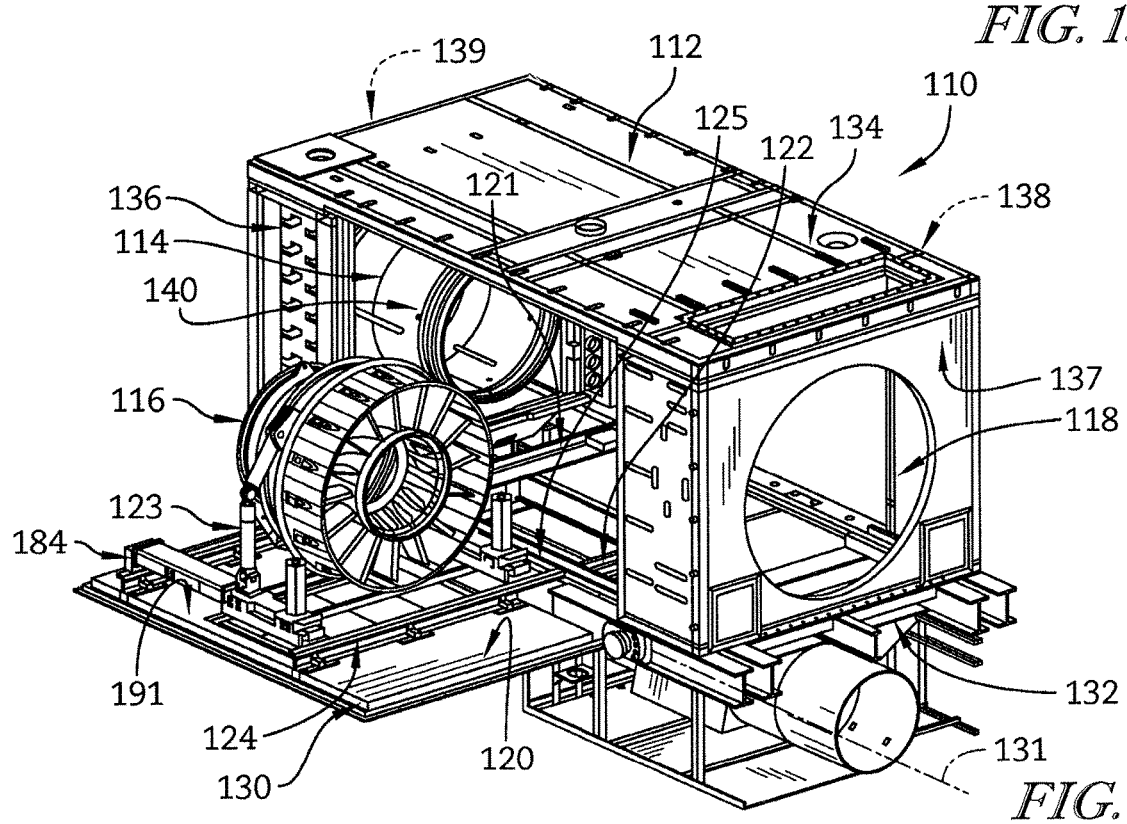

When the power turbine 118 and the transportation sled 180 reach the floor rails 121, 122, the power turbine 118 and the transportation sled 180 slide perpendicular to the alignment rails 125, 126 along the floor rails 121, 122 as suggested in FIG. 14. The power turbine 118 and the transportation sled 180 move along the floor rails 121, 122 out of the sheltered space 140 and onto the door rails 123, 124. From a position resting on the door 130 outside the engine package 112, the power turbine 118 can be lifted up by a hoist and lowered into a transport can or onto the platform 165 for repair or replacement. Installation of the gas generator 116 and/or the power turbine 118 may be accomplished by reverse completion of the steps described herein.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A gas turbine engine unit for use in a modular power generation system, the gas turbine engine unit comprising
    an engine package comprising a floor, a plurality of side walls, and a ceiling that cooperate to define a sheltered space, a gas generator arranged in the sheltered space defined by the engine package, wherein the gas generator is configured to drive a power turbine, and wherein the engine package comprises an inlet bell configured to receive and deliver an airflow to the gas generator disposed in the sheltered space, and
    a mechanical handling system adapted to convey the gas generator from inside the sheltered space to outside the sheltered space for repair or replacement,
    wherein the mechanical handling system comprises
        a door coupled to the engine package to pivot about a horizontal axis between a substantially vertical closed position and a substantially horizontal opened position,
        a plurality of floor rails coupled to the floor of the engine package and oriented horizontally, and
        a plurality of door rails coupled to the door to move with the door between a stowed position arranged in the sheltered space when the door is in the closed position and a use position outside the sheltered space when the door is in the opened position.

2. The gas turbine engine unit of claim 1,
    wherein the mechanical handling system includes at least one leg coupled to the door to pivot about a leg axis relative to the door between a stored position extending generally parallel to the door and a support position extending generally perpendicular to the door.

3. The gas turbine engine unit of claim 2,
    wherein the at least one leg includes a main member and an extension member coupled to the main member to slide relative to the main member between a retracted position and an extended position to change a length of the at least one leg.

4. The gas turbine engine unit of claim 1,
    wherein the mechanical handling system includes a transportation stand coupled to the gas generator for movement with the gas generator from inside the sheltered space to outside the sheltered space.

5. The gas turbine engine unit of claim 4,
    wherein the transportation stand includes a frame coupled to the gas generator and a plurality of roller feet coupled to the frame, the plurality of roller feet are arranged to engage the plurality of floor rails when the gas generator is inside the sheltered space, and the plurality of roller feet are arranged to engage the plurality of door rails when the gas generator is moved outside the sheltered space.

6. The gas turbine engine unit of claim 5,
    wherein each roller foot of the plurality of roller feet includes a support plate coupled to the frame, a first roller coupled to the support plate, and a second roller coupled to the support plate at a location spaced along a floor rail of the plurality of floor rails or a door rail of the plurality of door rails from the first roller.

7. The gas turbine engine unit of claim 1,
    wherein the mechanical handling system includes at least one bridge rail adapted to be coupled to the engine package and sized to fill at least a portion of a gap formed between one floor rail of the plurality of floor rails and a corresponding one door rail of the plurality of door rails when the door is moved to the opened position and the plurality of door rails are moved to the use position.

8. The gas turbine engine unit of claim 1, wherein the power turbine is arranged in the sheltered space defined by the engine package, the mechanical handling system includes a transportation sled coupled to the power turbine, and the transportation sled is configured to engage the plurality of floor rails and the plurality of door rails.

9. The gas turbine engine unit of claim 8,
    wherein the transportation sled includes a frame coupled to the power turbine and a plurality of roller feet and each of the plurality of roller feet include a support plate coupled to the frame, a first roller coupled to the support plate, and a second roller coupled to the support plate.

10. The gas turbine engine unit of claim 1, further comprising:
    a plurality of alignment rails coupled to the floor of the engine package and the plurality of alignment rails extend generally perpendicular to the plurality of floor rails, and
    a plurality of roller feet arranged to engage the plurality of floor rails and the plurality of alignment rails when the gas generator is inside the sheltered space and to engage the plurality of door rails when the gas generator is moved outside the sheltered space.

11. A gas turbine engine unit comprising
    an engine package including a floor, a plurality of side walls, and a ceiling that cooperate to define a sheltered space, and
    a mechanical handling system configured to convey a gas generator out of the engine package, wherein the gas generator is configured to drive a power turbine,
    wherein the mechanical handling system comprises:
    a door coupled to the engine package to move relative to the engine package between a closed position and an opened position,
    a plurality of floor rails coupled to the floor of the engine package,
    a plurality of door rails coupled to the door to move with the door relative to the engine package, a plurality of alignment rails coupled to the floor of the engine package and the plurality of alignment rails extend generally perpendicular to the plurality of floor rails, and a plurality of roller feet arranged to engage the plurality of floor rails and the plurality of alignment rails when the gas generator is inside the sheltered space and to engage the plurality of door rails when the gas generator is moved outside the sheltered space.

12. The gas turbine engine unit of claim 11, wherein the mechanical handling system includes at least one leg coupled to the door that extends generally perpendicular to the door from a side of the door opposite the plurality of door rails.

13. The gas turbine engine unit of claim 12, wherein the at least one leg is coupled to the door to pivot relative to the door.

14. The gas turbine engine unit of claim 11, wherein the mechanical handling system includes at least one bridge rail arranged in a gap formed between one of the plurality of floor rails and a corresponding one of the plurality of door rails.

15. A method of removing components from an engine package, the method comprising pivoting a door mounted to the engine package from a substantially vertical closed position to a substantially horizontal opened position, and sliding a gas generator out of a sheltered space defined by the engine package along a plurality of floor rails horizontally mounted to a floor of the engine package and a plurality of door rails mounted to the door, wherein the gas generator is configured to drive a power turbine, wherein the engine package comprises an inlet bell configured to receive and deliver an airflow to the gas generator disposed in the sheltered space.

16. The method of claim 15, further comprising pivoting at least one leg coupled to the door about a leg axis relative to the door from a stored position extending generally parallel to the door to a support position extending generally perpendicular to the door.

17. The method of claim 15, further comprising sliding the gas generator within the sheltered space defined by the engine package along a plurality of alignment rails extending generally perpendicular to the plurality of floor rails, wherein a plurality of roller feet are arranged to engage the plurality of floor rails and the plurality of alignment rails when the gas generator is inside the sheltered space and to engage the plurality of door rails when the gas generator is moved outside the sheltered space.

18. The method of claim 15, further comprising sliding the power turbine out of the sheltered space along the plurality of floor rails mounted to the floor of the engine package and the plurality of door rails mounted to the door.

19. The method of claim 18, further comprising sliding the power turbine within the sheltered space defined by the engine package along a plurality of alignment rails extending generally perpendicular to the plurality of floor rails.

* * * * *